United States Patent [19]

Richardson

[11] Patent Number: 4,702,322
[45] Date of Patent: Oct. 27, 1987

[54] EXPLOSION SUPPRESSION SYSTEM

[75] Inventor: Steven D. Richardson, St. Louis County, Mo.

[73] Assignee: The United States of America as represented by the Secretary of the Navy

[21] Appl. No.: 891,810

[22] Filed: Jul. 25, 1986

[51] Int. Cl.$^4$ ............................................. A62C 35/02
[52] U.S. Cl. ...................................... 169/28; 169/61; 169/62; 137/68.2
[58] Field of Search ....................... 169/60, 61, 62, 58, 169/28, 26, 70; 137/68.2; 244/135 R

[56] References Cited

U.S. PATENT DOCUMENTS

| 2,015,995 | 2/1934 | Egtvedt | 169/2 |
|---|---|---|---|
| 2,693,240 | 11/1954 | Glendinning | 169/62 |
| 2,736,386 | 2/1956 | Klompar | 244/135 R |
| 3,174,550 | 8/1961 | Bugg | 169/62 |
| 3,237,894 | 5/1963 | Wright, Jr. | 246/129 |
| 3,268,009 | 8/1966 | Bussey et al. | 169/58 |
| 3,915,237 | 10/1975 | Rozniecki | 169/58 |
| 3,986,560 | 10/1976 | Heath et al. | 169/61 |
| 3,993,138 | 5/1976 | Stevens et al. | 169/61 |
| 4,122,666 | 10/1978 | Roznlocki | 169/62 |

Primary Examiner—Jeffrey V. Nase
Assistant Examiner—Lynn M. Fiorito
Attorney, Agent, or Firm—Robert F. Beers; Harvey A. David

[57] ABSTRACT

An externally mounted fire or explosion suppressing device for aircraft fuel tanks includes a bottle of pressurized fluid suppressant agent, the bottle having a primary duct ending in a seal disposed against the exterior surface of a tank wall. A secondary duct is disposed at an angle to the primary duct and carries a pyrotechnic charge that is detonated in response to an optically detected flash in the tank and explosively cuts through the seal and tank wall to release suppressant into the tank.

4 Claims, 4 Drawing Figures

EXPLOSION SUPPRESSION SYSTEM

BACKGROUND OF THE INVENTION

This invention relates to the field of fire or explosion suppression in aircraft fuel tanks, and more particularly to a novel apparatus or device for that purpose which can be readily incorporated into new construction or can be easily retrofitted to existing aircraft without requiring mounting or structural modifications internally of a fuel cell, tank, or compartment and without requiring any new penetrations of a wall, prior to an event calling for flame or explosion suppression.

The single most important cause of aircraft losses in combat is fire or explosion in the fuel system. As an aircraft's fuel tanks empty, a highly explosive fuel-air mixture is left in the tanks which can be ignited by an incoming projectile or missile warhead fragments. The resulting explosion generates severe overpressures which cause catastrophic structural failure. A number of systems have been developed to interrupt this sequence either by reducing the ullage oxygen content to reduce its flammability, by incorporating foams or similar materials to retard the flame front, or by chemically suppressing an explosion with an inerting agent, typically "HALON". Each of these approaches has problems. Reducing oxygen content sufficiently to prevent vapor ignition can be done using systems with molecular sieves or semipermeable membranes to selectively pass nitrogen into the ullage spaces while trapping oxygen, but such systems tend to respond unfavorably to rapid altitude changes common to combat aircraft, with the result that they must be made excessively large and heavy to provide adequate inerting during maneuvering flight. The same results can be achieved by purging the ullage with nitrogen from a pressurized or liquid $N_2$ reservoir before entering combat, but the provisioning and handling of cryogenic liquids in a combat environment coupled with the necessity for refilling after each flight make this type of storage impractical, while pressurized gaseous nitrogen is excessively bulky. The use of foam, while practical and well-proven, involves significant fuel loss (about 7%) and weight penalties. The class of "HALON" inertant systems appear to offer the most promise for future systems since they involve substantially less weight and fuel volume loss penalties than the foams, while providing more reliable protection than the nitrogen generators and easier servicing than the liquid nitrogem systems.

The use of inertant systems for aircraft fire protection has a fairly long history. Explosion suppression systems, however, are a more recent concept and have not been completely proven. Two approaches to the problem are possible. In the first, adopted by the F-16, a reservoir of a fire suppressant liquid under pressure, such as that sold under the name "HALON", is activated by the pilot as he crosses into a combat area and is released into the ullage volume to provide a limited-duration inerting. This requires that the inertant bottle be refilled after each mission, significantly increasing turnaround time. Additionally, the aircraft remains vulnerable to surprise hits taken before the pilot has activated the system, or to second hits that may occur after the inerting gas has spilled overboard through a first-hit entry or exit hole. To overcome these deficiencies a second type of system as been previously proposed in which the inerting agent is stored in numerous small bottles mounted inside the tank. When needed, the agent is released only into the area in which vapor ignition has occurred. Such a system would employ optical sensors to detect the light flash of vapor ignition, a control unit to process the sensor signal, and "HALON" bottles in each ullage compartment to be triggered as needed by the control unit. A distribution tube network would be used to transfer each bottle's output through structural partitions to ensure that sufficient inertant reaches all parts of the ullage volume to suppress an explosion before destructive overpressures occur. Advantages include relatively low weight and small fuel loss penalties, low maintenance, low logistics penalties, automatic operation when needed, and multiple hit protection. However, a relatively large number of penetrations must be made into the pressurized fuel tank for interconnections between the components inside and outside of the tank. Structural modifications must be made to tank interior components to allow cutouts for distribution tubing. In addition, the "HALON" bottles fitted inside the tank contain both electrical wiring which must be prevented from sparking and explosive squibs for bottle actuation which could be inadvertently fired by a spurious signal. Accidental bottle firing could cause structural damage if the tank was comletely full. It would also require opening the fuel tank for replacement of the fired bottle, which could be a time-consuming task given the limited access available in most fuel tanks and the likelihood of creating leaks when the tank is closed. Finally, recent tests of such a system designed for a wing tank have shown that the detection of an explosion and actuation of a "HALON" bottle can be accomplished in a satisfactory time, but the use of distribution tubing to direct the intertant to all hidden areas of the compartment introduces unacceptable time delays.

With the foregoing in mind, it is a principal object of the invention to provide an improved fire or explosion suppression device or system for aircraft fuel tanks.

Another object of the invention is to provide fire or explosion apparatus that overcomes the major operational deficiencies and shortcomings of the prior art systems discussed above, and yet is reliable in operation, economical to implement, and which can be easily retrofitted to most fuel tank configurations with little or no tank intrusion during such retrofitting, and concomittently can be accessed for servicing without entry into the fuel tanks.

As another object, the invention aims to accomplish the foregoing through the use of a novel suppressant agent containing bottle or flask having a dispensing duct and a shaped or directed charge operable to remove a duct seal and penetrate the tank wall so as to release the suppressing agent into the tank at an optimal location, and directed so as to suppress the initiating fire or explosion.

Yet another object of the invention is to provide a fire suppressant device that can be incorporated with a number of like devices into a fire or explosion suppressant system of the type wherein electro-optical sensing means are used to detect an incipient explosion and cooperate with a control logic to detonate the appropriate explosive charge or charges of one or more of the explosion extinguishing bottles suitably distributed on the walls of the aircraft or other fuel tanks.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
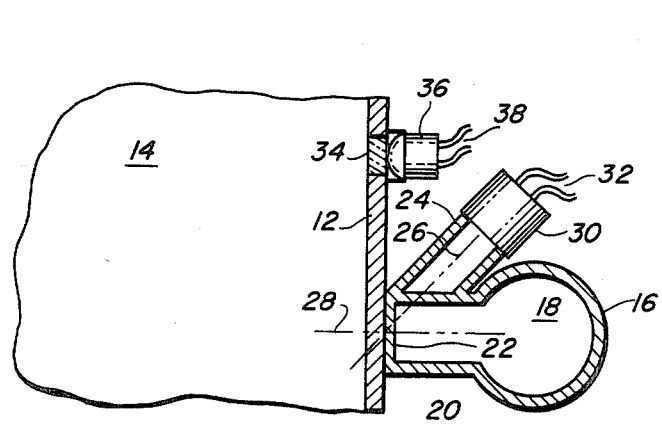
FIG. 1 is a sectional view of a fuel tank explosion suppressant device embodying the present invention.

In the exemplary form of the invention illustrated in FIG. 1, a novel pyrotechnic charge actuated explosion suppressant device is shown generally at 10 in association with a fuel tank wall 12 confining a flammable ullage 14. The device 10 comprises a flask or bottle 16 containing a charge or quantity of fire suppressant agent 18 under pressure. The bottle 16 has a neck-like suppressant discharge duct 20 that is closed by an end wall or seal 22. The end wall or seal 22 is disposed against the fuel tank wall 12 with the discharge duct extending substantially normal to that wall.

The device 10 further comprises an actuating charge directing secondary duct 24 extending from the discharge duct at an acute angle thereto such that the axis 26 of the secondary duct intersects the axis 28 of the discharge duct substantially at the end wall or seal 22. At the outer end of the duct 24 is disposed a pyrotechnic cartridge 30 in the form of a shaped or directed charge that can be fired by an electrical pulse supplied via wire leads 32.

Conveniently disposed adjacent a transparent window 34 in the tank wall 12 is a remote optical detector element or flash sensor 36. The sensor 36 may be of any well known electro-optical construction that will provide a suitable electrical signal on wire leads 38 upon occurrence of a flash accompanying an incipient fire or explosion within the tank ullage.

Figure 2:
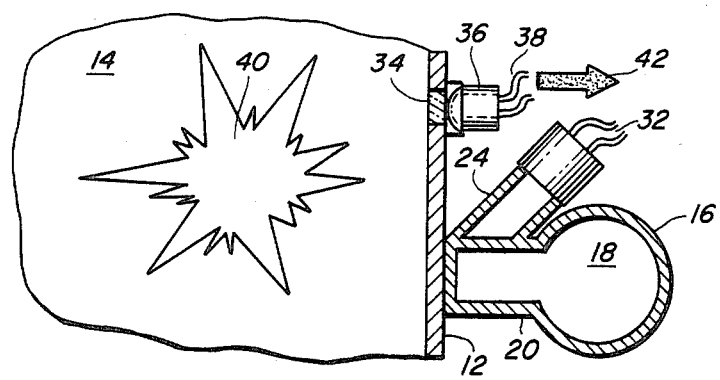
FIGS. 2-4 are views similar to FIG. 1, but showing the device in sequential stages of operation.
Figure 3:
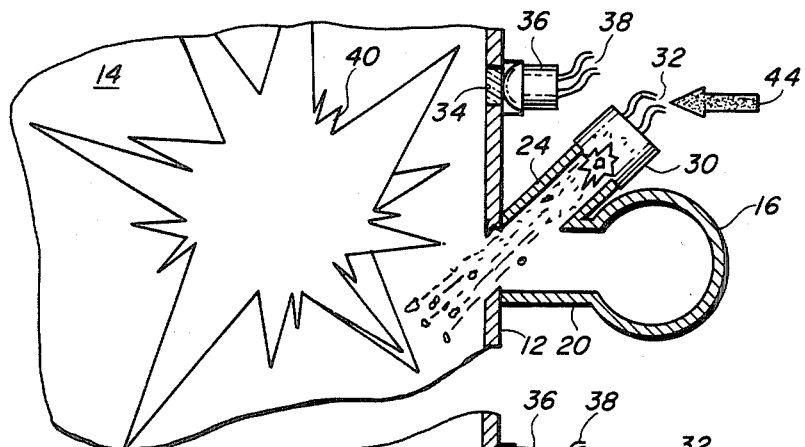

The operation of the device 10 will now be described with reference successively to FIGS. 2-4. In FIG. 2 a vapor ignition flash 40 has occurred in the ullage 14 and is optically sensed by sensor 36 which produces a corresponding electrical trigger signal 42 to a control unit (not shown). The control unit, which may be of any well known construction suitable for the purpose, responds to the trigger signal to provide a charge detonating electrical pulse 44, as shown in FIG. 3, to the pyrotechnic cartridge 30 via leads 32.

The cartridge 30 is thereby detonated to direct an explosive force along axis 26 within duct 24 so as to explosively cut through the side wall of duct 20, the end wall or seal 22 of that duct, and the wall 12 of the fuel tank, all during a rising overpressure condition within the tank.

Figure 4:
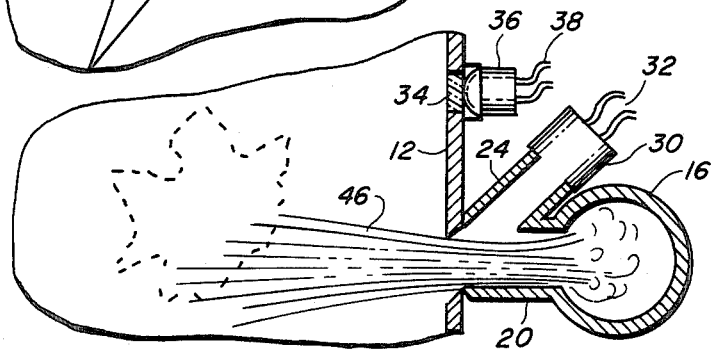

As shown in FIG. 4, the removal of the end wall or seal 22 and a portion of tank wall 12 so as to make a small hole therein in registration with the duct 20, allows the agent or medium 18 within the bottle 16 to discharge as a jet 46 through duct 20 into the tank so as to form a cloud that snuffs or suppresses the incipient fire or explosion therein.

The bottle 16, the primary and secondary ducts 20 and 24, and the casing of the pyrotechnic cartridge 30 remain as a closure for the small hole formed in the tank wall so that, with the fire and/or explosion suppressed, the fuel in the tank is prevented from being lost and continues to be available for use.

It will be recognized that other forms of sensors may be used, such as optical fibers threaded into tank areas not readily accessed by simple ports, and that any number of the devices 10 may be ganged in a system covering numerous tanks or tank segments, and the devices may be housed in suitable fairings when used on airfoil or other external surfaces.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A device for suppression of fire or explosion in a fuel tank having a tank wall, said device comprising:
    a flask or bottle for confining a fire suppressant medium under pressure, said bottle having a primary duct terminating in an end wall disposed against an external surface of said tank wall;
    a secondary duct extending at an angle from said primary duct;
    a charge of a fire suppressant medium contained under pressure in said bottle; and
    pyrotechnic means, disposed at the outer end of said secondary duct for explosively cutting through said end wall and a portion of said tank wall in registration therewith for releasing said fire suppressant medium into said tank.

2. A device as defined in claim 1, and wherein:
    said secondary duct is disposed at an acute angle to said primary duct such that the axis of said secondary duct intersects the axis of said primary duct substantially at said end wall.

3. A device as defined in claim 2, and wherein said pyrotechnic means comprises a shaped explosive charge.

4. A device as defined in claim 3, and wherein said bottle, said primary and secondary ducts, and said pyrotechnic means are cooperable after activation to prevent fuel leakage from said tank.

* * * * *